(No Model.)
H. M. CRANE.
COMMON BATTERY MULTIPLE SWITCHBOARD.
No. 590,304. Patented Sept. 21, 1897.
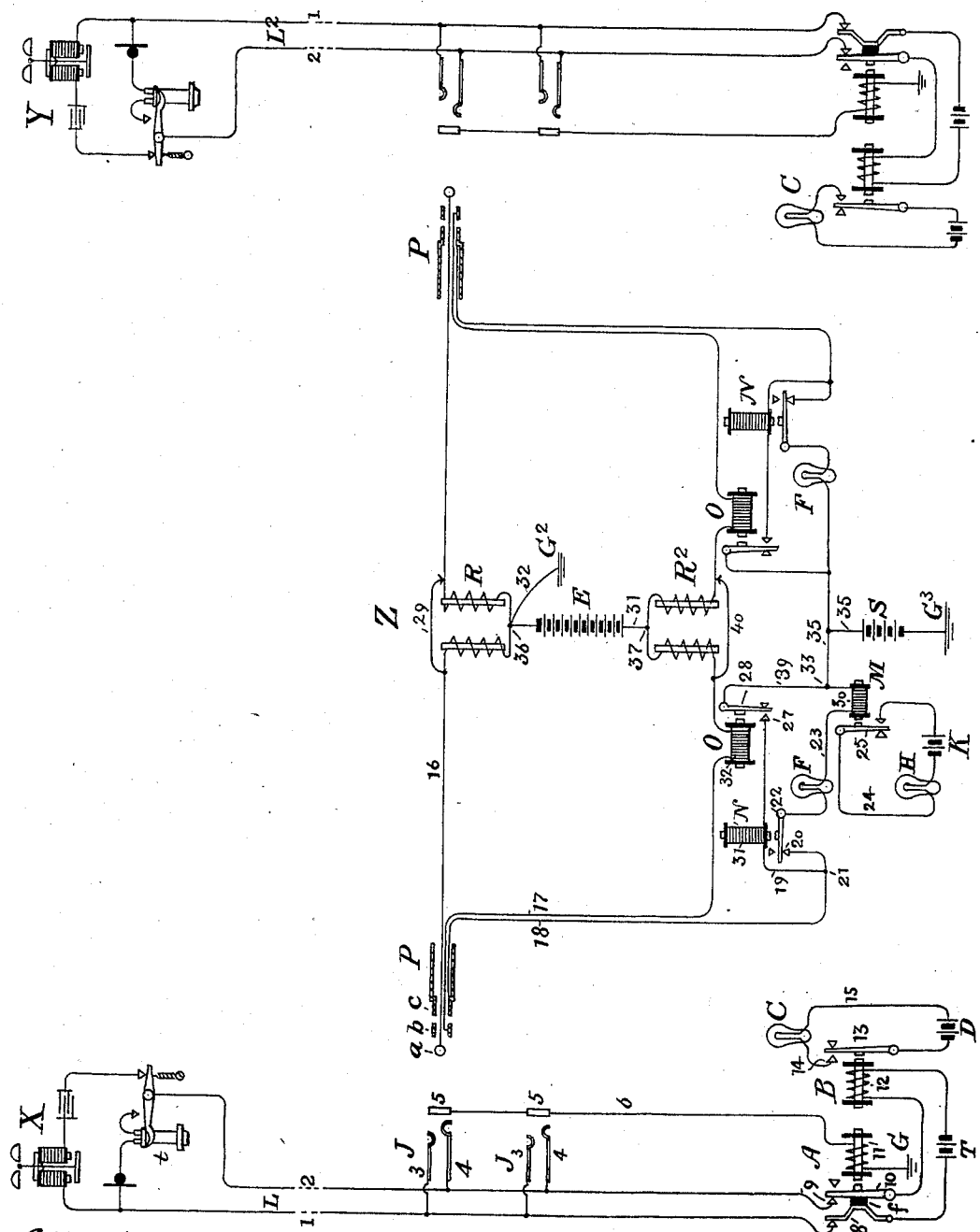
Attest.
Frank C. Lockwood.
Geo. Willis Pierce
Inventor,
Henry Middlebrook Crane

UNITED STATES PATENT OFFICE.

HENRY MIDDLEBROOK CRANE, OF BOSTON, MASSACHUSETTS, ASSIGNOR TO THE AMERICAN BELL TELEPHONE COMPANY, OF SAME PLACE.

COMMON-BATTERY MULTIPLE SWITCHBOARD.

SPECIFICATION forming part of Letters Patent No. 590,304, dated September 21, 1897.

Application filed August 9, 1897. Serial No. 647,576. (No model.)

*To all whom it may concern:*

Be it known that I, HENRY MIDDLEBROOK CRANE, residing at Boston, in the county of Suffolk and State of Massachusetts, have invented certain Improvements in Common-Battery Multiple Switchboards, of which the following is a specification.

The present invention has reference to metallic-circuit multiple switchboards in which the line and supervisory signals are automatically operated and the telephone-transmitters at the associated substations are energized from one or more centralized batteries or sources of current located at the central station.

The invention is associated with a form of substation-circuit commonly known as the "relay-circuit," in which a relay located at the central office operates to open the normal route of the main circuit, when one of the cord-plugs is inserted in a spring-jack of the said circuit, leaving the line-signal and its operating-battery on a severed branch and continuing the main circuit to a common battery and repeating-coil in the cord-circuit.

The object of the invention is to minimize the expenditure of battery-current while conversation is going on between two connected substations; and it consists in an improved arrangement of the cord-circuit whereby when the cords are up and the circuit closed at the substation the current required in the local or test circuit is admitted thereto and regulated and maintained at a low strength by means of a suitable resistance, the supervisory signal-circuit being at this time maintained open and without current, while when the circuit is opened at the substation the said resistance is switched out, the signal-circuit closed, and the signal-current so strengthened that it is sufficient to light and fully display the signal contained in the said local circuit.

In carrying out the invention the arrangement is such that when the plugs are in the spring-jacks of two substation-circuits the line-signals are cut off and the circuits are continued through the tip and sleeve conductors of the cord-circuit, there being a common battery or other generator and repeating-coil in a bridge between the said conductors as usual, and the sleeve-conductor between the two plugs contains for each plug the helix of a supervisory relay, the said relays being placed one on each side of the bridge. A third conductor extends between the inner sleeve-conductors of the plugs and has a branch extending from a substantially central point thereon to a ground or return connection through a battery. This third conductor divides into two parallel branches in the cord of each plug, which branches are united again before the battery is reached, the upper branch including the helices of a signal-switching relay of considerable comparative resistance and the front contact and armature of the supervisory relay serving as a device controlling the continuity of the said branch, and the lower branch includes the back contact and armature of the signal-switching relay, serving in the same way as a device controlling the continuity of this branch and the supervisory lamp-signal. The helix which is adapted to close the pilot lamp-circuit is included in the said lower branch on the answering-plug side of the cord-circuit, and this helix may be common to a number of cord-circuits, in a manner well understood.

The invention is fully set forth in the accompanying drawing, which represents two substations X and Y with telephone-lines extending to spring-jacks and signal-controlling switches in a telephone-switchboard, the switchboard being provided with the usual number of plugs and cords at each section, though a single pair of plugs and their plug-circuits, together with supervisory signals, are shown.

The telephones and signaling apparatus at the substations may be of any well-known arrangement adapted for the operation of automatic signals, current in the line from a central source being determined by a switch at the substation operated in the use of the telephone.

The line conductors 1 and 2 of the circuits L and L² are led to contact springs or surfaces 3 and 4 of spring-jacks J at the switchboard, after which the conductors terminate at and include the helix 12 of line lamp-signal relay B, the armature 13 of which is adapted to close and open the local circuit 15, in which is placed the line lamp-signal C and battery D.

6 is the test-circuit, represented at each spring-jack by the rings 5 and grounded at G through the helix 11 of the line cut-off relay A, whose armature-levers 8 and 10, united by the insulating-block $f$, may be adapted to move as one piece and normally form a part of the respective conductors 1 and 2.

P and P² are the answering and connecting plugs of the cord-circuit Z, their tips $a$ being united by the conductor 16, which includes the helices of the repeating-coil R in parallel with the loop 29, and their sleeves $b$ being united by the conductor 17, which includes the helices 32 of the supervisory relays O O and the helices of the repeating-coil R² in parallel with the loop 40. 31 is a bridge-wire between the central points 36 and 37 of the coils R and R². In practice the coils R and R² are wound upon the same core and may be in fact halves of the same coil and are mounted upon a common base, but are herein shown separated for clearness.

32 is a wire to ground G² from the point 36. The inner sleeve-contacts $c$ of the plugs are connected to battery S and ground G³ by means of conductors 18, 39, and 35, conductor 18 dividing at the point 21 into two branches 19 and 23, which unite at the point 33. The upper branch includes the helices 31 of the signal-switching relay N and is normally open at the contact 27 of the armature 28, which when attracted operates to close the branch 19. The lower branch is normally closed and extends by contact 20, armature 22, wire 23, and supervisory lamp-signal F, and is organized to be opened at the points 20, when the test-current flows through relay N. The relay-armature 28 and its front contact 27 thus constitute a circuit-controller for the branch 19, and the armature 22 of the signal-switching relay N and its back contact 20 in like manner form a circuit-controller for the branch 23. In the answering-plug side the helix 30 of the relay M is connected into the lower branch and is adapted to close the local circuit 24 by means of its armature 25 and thereby control the display of the pilot lamp-signal H.

In the operation of the invention the subscriber at the substation X wishing a conversational connection removes the telephone $t$ from the hook-switch, which rises and closes the circuit L, lighting the line lamp-signal C in a well-known manner. The operator inserts the plug P into the spring-jack J, the tip $a$ thereof making contact with the spring 3, the sleeve $b$ with the spring 4, and the inner sleeve with the test-ring 5. Current from the battery E then circulates in the main circuit, causing the electromagnet of the supervisory relay 32 to attract its armature 28 and close the contact 27, establishing a circuit from battery S, through the upper local circuit branch by way of wires 35, 19, 18, sleeve-conductor $c$, test-ring 5, wire 6, electromagnet 11 of relay A, and ground G, back to ground connection G³. The flow of current in this circuit results in the attraction of armature 22 to its front stop and the consequent opening of the lower branch 23, and also in the attraction of the armatures 8 and 10 of the cut-off relay A and the severing of the main circuit at the points 7 and 9. The main circuit being thus opened the armature 13 falls back and the line lamp-signal C is extinguished.

The amount of current flowing from the battery S through the test-circuit is regulated and diminished by the introduction into that branch of the circuit which during a conversation is closed of the relatively high resistance 31 of the electromagnet of the signal-switching relay N, which reduces the said current to a point which while sufficient for testing purposes is yet much lower than otherwise could be attained.

It becomes practicable to effect this economy of current by reason of the arrangement of my invention which divides the test and signal current circuit into two branches, one of which contains the supervisory signal and the relay of the pilot-signal and is controlled by a relay in the other, which has its own continuity controlled by a relay in the main circuit and which operates to open the signal branch during the pendency of a conversation, leaving the other or high-resistance branch only closed.

The busy test is applied in the usual manner, which is well understood by those skilled in the art.

When at the conclusion of a conversation the telephone $t$ is hung upon its hook-switch at the substation and the main circuit thereby opened, current from battery E ceases to flow therein and the armature 28 of the supervisory relay O falls away from contact 27. This opens branch circuit 19, the electromagnet 31 of relay N becomes demagnetized, and its armature 22 falls upon the contact 20, closing the signal branch 23, and current from battery S now flows via wires 35, 39, and 23, relay-magnet 30, supervisory lamp-signal F, armature 22, contact-point 20, wire 18, sleeve-conductor $c$, ring 5, wire 6 to ground G and back to the source by ground G³. The lamp F is lighted and gives the signal that the telephone has been hung and that the lines may be disconnected. There being no resistance in the right-hand cord-circuit and but the slight resistance of the electromagnet 30 in the left-hand cord-circuit the full or nearly full strength of current from the battery is available to light the lamps.

It will be seen that while conversation is taking place the amount of current flowing from battery S is lessened and economized; but when conversation is finished and the telephone hung up the current is strengthened and becomes available for signaling purposes, as in the first instance a high-resistance circuit is established through the test-circuit, while the low-resistance path is opened, and in the latter case a low-resistance test and signal circuit is formed through which the whole current flows, the alternative branch in turn being opened.

I claim—

1. In a telephone system, the combination of a main or substation circuit having plug-socket-switchboard connections at a central station, and plug and switch-cord complementary connectors, each plug and cord having two main-circuit conductors looped through a current-generator; with a third conductor for said plug and cord, forming a part of a local signal and test circuit also containing a source of current, and divided into two parallel branches; a relay in one of the said main conductors controlling the continuity of one of said branches and adapted when excited to close the same; a signal-switching relay in the said branch controlling the continuity of the other branch, and adapted when excited to open it; and a supervisory signal in the said other branch; whereby the said signal branch is maintained open and the signal undisplayed during a conversation but is closed and the signal displayed on the close of such conversation; substantially as specified.

2. The combination in a telephone-exchange system, of a main or substation circuit having its conductive continuity controlled at the substation by the automatic telephone-switch, and extending to plug-socket-switchboard connections at the central station; and a switch plug and cord comprising two main-circuit conductors looped through a battery; with a third conductor comprised in said switch plug and cord, adapted to conduct a test and local signal current, and divided for a portion of its length into two branches, one of high and the other of low resistance; a supervisory signal in the low-resistance branch; and automatic circuit-controllers for the said high and low resistance branches, actuated by relays in the main circuit and the said high-resistance branch, respectively, and adapted to close the local circuit through the high-resistance branch alone, for the passage of a weak current, as long as the plug remains in the switch-socket, and the main circuit closed at the substation-switch, and through the low-resistance branch alone for the passage of a stronger current when the main circuit is closed by the said substation-switch; substantially as described.

3. In a telephone-exchange cord-circuit the combination of two plugs each provided with three contacts, two of which on one plug are respectively united with the similar ones on the other plug by separate conductors, which are adapted to constitute a part of a main circuit, the third contacts of the plugs being also united by a local circuit-conductor grounded through a battery, substantially at its center, and divided into two branches; a bridge between the said main-circuit conductors including a battery; a supervisory lamp-signal on each side of the bridge in one of the branches of the said divided conductors; a signal-switching relay in the other branch of said conductors controlling said signal branch; and a supervisory relay in one of the said through-conductors, controlling the continuity of the said other branch, when the respective plugs are inserted in line-switches or spring-jacks; as set forth.

4. The combination in a telephone system, of a number or group of substation-circuits, each normally open at the substation and extending to switch connections upon the switchboard-sections at a central station; and a switch at the substation adapted to close the main circuit when the telephone is taken up for use, and open it again when replaced; with a switch-cord circuit having two main and one local circuit-conductors, the latter conductor being divided into two parallel branches, of different resistance, and grounded through a battery; a bridge between the two main conductors including a battery and repeating-coils; supervisory lamp-signals on each side of the bridge in the low-resistance branch of the said local circuit-conductor; an electromagnet in one of the main conductors, controlling the high-resistance branch and an electromagnet in the said branch controlling the low-resistance branch; whereby upon the insertion of the answering-plug into a spring-jack, a high-resistance test-circuit is established and the supervisory lamp-signal switched out, and upon the opening of the main circuit at the substation, a low-resistance test and signaling circuit is established and the supervisory lamp-signal lighted, as set forth.

5. The combination of a substation-circuit provided with spring-jacks at the switchboard-sections, and adapted for the operation of automatic signals, current in the line from a central source being determined by the telephone-switch at the substation; a line lamp-signal; a controlling device therefor; and a circuit-controlling device and test-circuit; with a cord-circuit comprising three conductors, two of which are adapted to constitute a part of the main circuit, the third being divided into two branches and forming part of a local battery-circuit; a bridge between two of the conductors including a battery and repeating-coils; a supervisory lamp-signal and a relay-magnet on each side of the bridge in the respective branches of the said third local conductor; and a relay-magnet in one of the main-circuit cord-conductors; whereby upon the insertion of the answering-plug into a spring-jack a high-resistance test-circuit is established and the supervisory lamp-signal concealed, and upon the opening of the main circuit at the substation a low-resistance test-circuit is established and the supervisory lamp-signal lighted; as set forth.

In testimony whereof I have signed my name to this specification, in the presence of two subscribing witnesses, this 30th day of July, 1897.

HENRY MIDDLEBROOK CRANE.

Witnesses:
GEO. WILLIS PIERCE,
JOSEPH A. GATELY.